(12) United States Patent
Pohl

(10) Patent No.: US 6,910,066 B1
(45) Date of Patent: Jun. 21, 2005

(54) SYSTEM, METHOD, AND APPARATUS FOR APPLET CACHING

(75) Inventor: Thomas J. Pohl, Urbandale, IA (US)

(73) Assignee: Principal Financial Services, Inc., Des Moines, IA (US)

( * ) Notice: Subject to any disclaimer, the term of this patent is extended or adjusted under 35 U.S.C. 154(b) by 812 days.

(21) Appl. No.: 09/799,277

(22) Filed: Mar. 5, 2001

(51) Int. Cl.[7] .............................................. G06F 15/16
(52) U.S. Cl. ...................................... 709/203; 709/217
(58) Field of Search ................................ 709/200–203, 709/217–219, 212–213; 715/501.1, 513; 717/118, 146–148

(56) References Cited

U.S. PATENT DOCUMENTS

| | | | | |
|---|---|---|---|---|
| 5,572,643 A | * | 11/1996 | Judson | 709/218 |
| 5,774,660 A | * | 6/1998 | Brendel et al. | 709/201 |
| 5,787,470 A | * | 7/1998 | DeSimone et al. | 709/218 |
| 5,924,116 A | * | 7/1999 | Aggarwal et al. | 711/122 |
| 6,185,586 B1 | * | 2/2001 | Judson | 715/513 |
| 6,370,687 B1 | * | 4/2002 | Shimura | 709/203 |
| 6,466,967 B2 | * | 10/2002 | Landsman et al. | 709/203 |
| 6,636,863 B1 | * | 10/2003 | Friesen | 717/118 |
| 6,744,452 B1 | * | 6/2004 | McBrearty et al. | 715/853 |

\* cited by examiner

Primary Examiner—Bharat Barot
(74) Attorney, Agent, or Firm—McKee, Voorhees & Sease, P.L.C.

(57) ABSTRACT

The present invention involves a system, method, and apparatus for applet caching. The method includes requesting a web page from a server, the web page including an applet tag identifying a first applet for execution; executing the first applet in response to receiving the web page; and determining if a second applet is cached locally based on the execution of the first applet. The present invention also includes a method of applet loading on a client having the steps of requesting a web page from a server, the web page including a cache check to be executed by the client and determining if an applet is cached locally based on the execution of the cache check. The invention further includes a system and apparatus for client caching.

20 Claims, 3 Drawing Sheets

SYSTEM, METHOD, AND APPARATUS FOR APPLET CACHING

BACKGROUND OF THE INVENTION

1. Field of the Invention

This invention relates to applet caching. More particularly, though not exclusively, the invention relates to a system, method, and apparatus for persistently caching an applet on a client computer.

2. Problems in the Art

JAVA is an object-oriented programming language that was originally developed by Sun Microsystems and is popular on the internet, intranets, and other applications, including applications that run on embedded controllers. The JAVA language can be used to create both JAVA applets and JAVA applications.

JAVA applications and JAVA applets differ in a number of respects. JAVA applications are standalone programs that can be executed using only a JAVA interpreter. In contrast, JAVA applets typically run from within a world wide web browser or other application that is JAVA-enabled. When used within a web browser, references to a JAVA applet are embedded within a web page through the use of a special hypertext markup language (HTML) tag.

A client machine uses a JAVA-enabled web browser to load a web page with the embedded JAVA applet. The browser then downloads the JAVA applet from the web server hosting the applet. The web browser executes the JAVA applet locally.

One problem often associated with JAVA applets is long download time. Because applets are downloaded each time that a web page containing the applet is loaded, more bandwidth and download time is required for JAVA applets, as opposed to JAVA applications.

In addition to JAVA applications, other alternatives include common gateway interface (CGI) scripting and servlet applications. These alternatives rely upon the program or application being run on the server as opposed to the client. Executing the application on the server eliminates the download time associated with applets. However, it also increases the load on the server, requiring additional server resources. For this very reason, applets are often cached.

Caching may occur while using a web browser, as the web browser caches a limited amount of information previously downloaded by the web browser. This information may include web pages and applets. There are a number of problems with this type of cache being used for applets. First, the contents of a web browser cache are periodically emptied or flushed to make room for newer documents and resources. An applet is particularly susceptible to being flushed or deleted from the cache. Because the applet is usually large in comparison to other cached files, the browser's cache will remove the applet to make room for other files. In addition, where a web browser is used, frequently, a number of different files or resources may be cached. This requires that the applet be emptied from the cache to make room for the other materials. Those skilled in the art will appreciate the need for an applet cache which is not susceptible to being overwritten.

A further problem associated with web browser caches is that the caches are sometimes used even though a more recent JAVA applet is available or required. What is cached may not be the most current or most recent JAVA applet and thus may not operate properly, may not provide full functionally or may otherwise be undesirable. Thus, there is also a need in the art for a JAVA applet caching system that can determine whether the cached file or applet is the most current application or applet, and if not, download the most current applet as needed.

Another inherent problem with caches is that they are limited in size. As such, caches cannot store everything and are therefore periodically emptied or the cached files are otherwise overwritten with other files. When cache sizes are small, there is a problem if what needs to be cached is larger than the limitation in size. Thus, there is a need for an applet cache that is large enough to contain needed applets.

A further problem with applet caching is that the caching is not persistent. Different techniques such as least recently used (LRU) algorithms are used to remove items from the cache in order to make room for new additions. It may not be desirable to remove these applets, if it is known that the cached item will be required, and especially if the applets are large in size. If the applet is not in the cache when needed, then there is no benefit to caching the applet.

Yet another problem with certain types of caching is that the caching requires the use of a plug-in. The plug-in requires added installation time and overhead, and is therefore an impediment to use of an applet. The plug-in would require additional resources of the client computer as well as the additional installation process of the plug-in itself. JAVA can be run on a number of platforms, including in embedded processors or controllers. In these types of applications and others, there is even less likelihood that additional resources and/or plug-ins are available Still further, the communications channel may be limited, so that the time it takes for an uncached applet to be loaded may be even greater, more inconvenient, or otherwise undesirable. Thus, there is also need for an applet cache that does not require the use of a plug-in.

SUMMARY OF THE INVENTION

This invention relates to applet caching. The invention provides for an intelligent caching scheme that is persistent. As part of the invention, an applet is loaded from a server to a client, the first applet determining whether or not a second applet is present. The second applet may include required class files or other resources. If need be, the second applet and associated files are loaded from the server into the client's cache. One or more files may need to be added, replaced, or updated. Once the necessary files are present in the client cache, then the locally cached applet is executed.

The present invention further includes an apparatus for providing persistent applet caching on a client. The apparatus is located on a server having a web site with web page code. A first applet is embedded in the web page code through use of the applet tag. The first applet capable of being executed on the client, determining whether a second applet is present on the client, causing the second applet to be loaded into a cache on the client, and causing the second applet to be executed by the client.

The present invention further includes a system of applet caching, including (1) a web page located on a server, the web page accessible by a client; (2) a first applet associated with the web page; and (3) a second applet. The first applet determines whether the second applet is cached on the client and is capable of receiving the second applet from the server and caching the second applet on the client.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF PREFERRED EMBODIMENT(S)

Incorporated herein is a computer program source code appendix of functions used to perform cache checking, cache creation, and cache updating functions. Copyright 2000 by Principal Financial Group. A portion of the disclosure of this patent document contains material which is subject to copyright protection. The copyright owner has no objection to the facsimile reproduction by anyone of the "Source Code Appendix" as it appears in the Patent and Trademark Office-file or records, but otherwise reserves all copyright rights whatsoever.

The present invention will now be described as it applies to an exemplary embodiment. It is not intended that the present invention be limited to the described embodiment. It is intended that the invention cover all modifications and alternatives which may be included within the spirit and scope of the invention. Those skilled in the art will appreciate the advantages of the invention over the current caching schemes for applets, the present invention providing a client cache that is persistent and dedicated. Furthermore, the client cache can be implemented through another applet.

Figure 1:
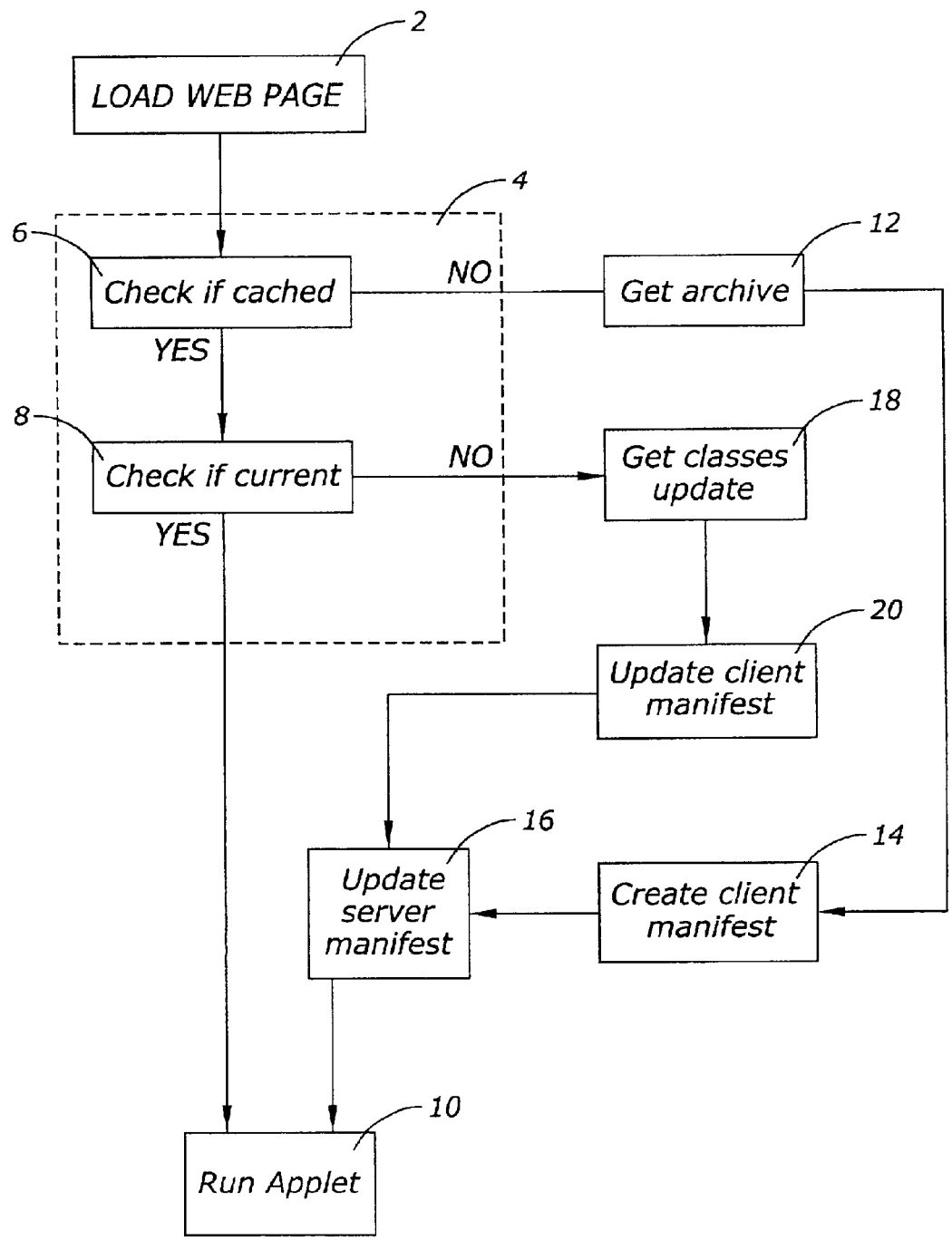
FIG. 1 is a diagram showing the logic and flow of a preferred embodiment of the present invention.

FIG. 1 shows the logic flow of one embodiment. A web page is loaded at step 2. It is to be understood that the web page is located on a server and is requested by a client. The web page includes an applet. The present invention contemplates that the applet may be a JAVA applet, or other type of applet such as may be known in the art. One way for the web page to contain the applet is for the web page to have an applet tag referencing the applet. The applet may be otherwise embedded within the web page such as may be known in the art. For example, instead of an applet, a script may be used.

Next, a checking step 4 determines whether a second applet, including any required classes, is stored locally on the client. Those skilled in the art should understand that the second applet may be large in size and/or may have many classes or dependent files. Thus, if the second applet was to be loaded each and every time the client computer required the applet, a substantial use of time and bandwidth would be required. The cache checking applet at the checking step 4 first checks to see if the second applet is cached at step 6. If the second applet is not cached, then an archive is downloaded (see step 12). The archive may be a JAVA archive (JAR), a zip file, a cabinet file, or other file or archive such as is known in the art. The present invention further contemplates that the archive may be a self-executing file. The archive can contain the second applet, associated class files, installation files, data files, and other files, such as may be needed or desirable in the installation or use of the second applet.

The checking step 4 performs the functions of checking if the applet is cached and if so, checking if what is cached is current as shown in step 8. If the cached applet is current, then the cached applet can be executed at step 10. If the cached applet is not current, then an update may be performed. For example, if the applet requires a number of class files, and the class files are such that some class files are current, but other class files are either missing from the cache or else the cached class file is not current, then the new or missing class files must be downloaded from the server.

After the class files have been updated (step 18), the client manifest is updated (step 20). The present invention contemplates that this updated manifest can occur as each file is copied or updated locally or after some or all of the update operations. The client manifest contains information such as the class name of each file, the class size, a checksum for each file and a date associated with each file or other information. After the client manifest has been updated, the server manifest is updated as well in step 16. It is to be understood that the order of operation of the server manifest and client manifest updates can vary. After the manifests have been updated, then the applet can be executed from the client machine using the applet located in the client's applet cache.

Figure 2:
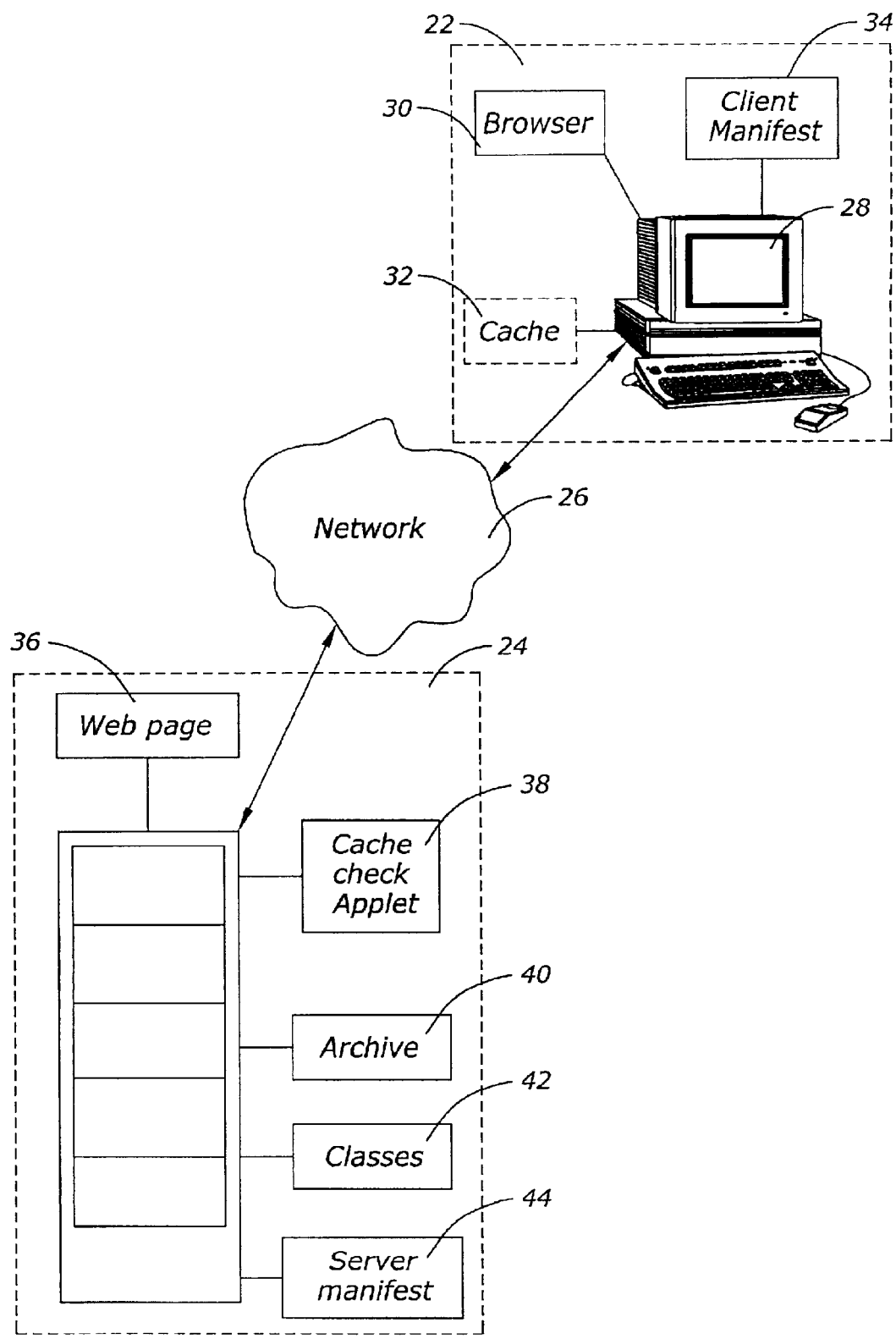
FIG. 2 is a diagrammatic representation of a system according to a preferred embodiment of the present invention.
Figure 3:
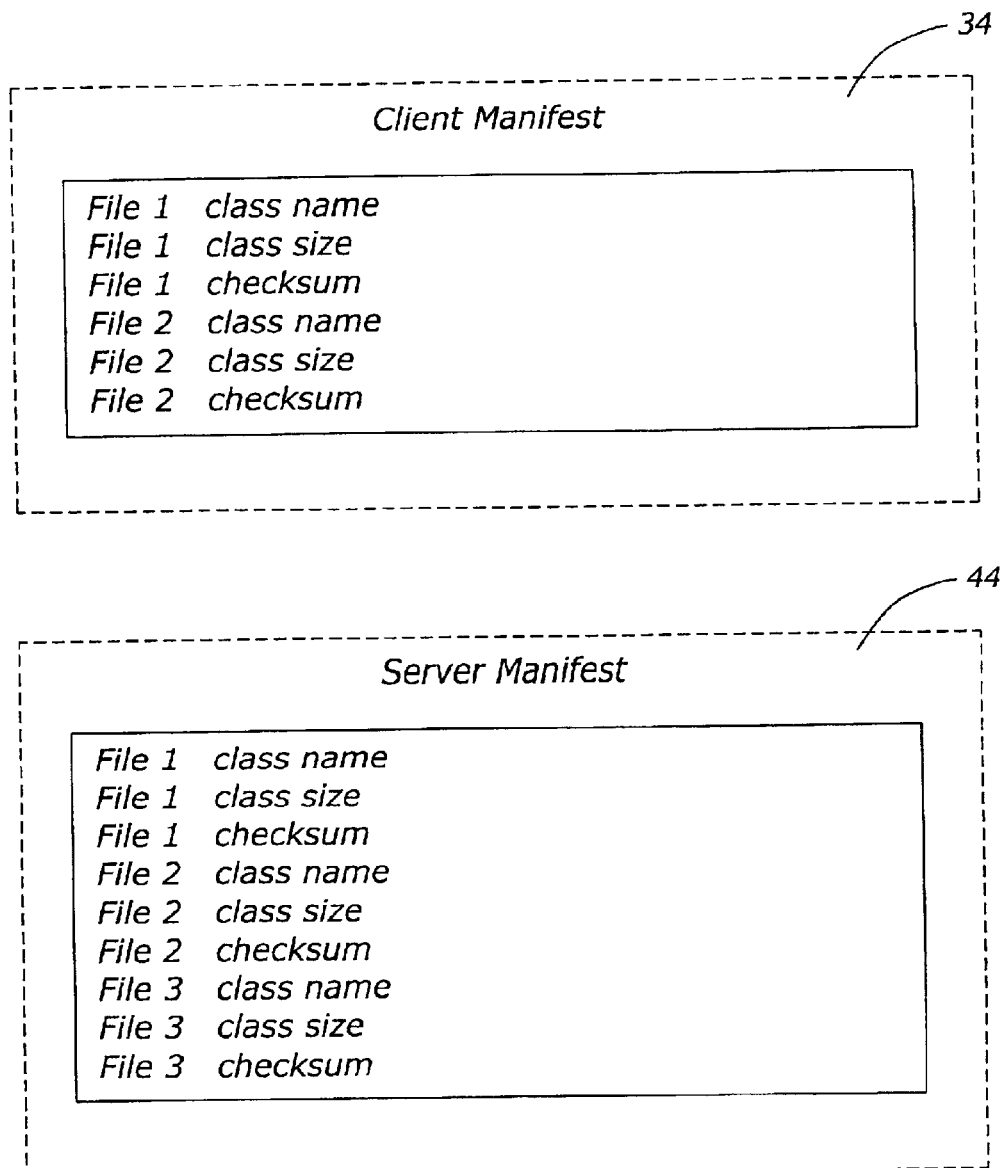
FIG. 3 is a representation of a client manifest and server manifest from a preferred embodiment of the present invention.

FIG. 2 shows one embodiment of a system using the present invention. The system includes a client 22 and a server 24. The client and the server 24 are both connected to a network 26. The network 26 may be the Internet, the an intranet, or other network. A client computer 28 may have a web browser 30. The browser may be NETSCAPE NAVIGATOR, MICROSOFT INTERNET EXPLORER, or other browsers such as may be known in the art. The present invention also contemplates that a browser need not be required if another application is capable of web access or browsing. In addition, the client 22 has an applet cache 32. The applet cache 32 contains the applet or applets that are cached, including associated files. The client 22 also includes a client manifest 34. The contents of the client manifest 34 are best shown in FIG. 3. A client manifest can contain information for each file or class. This information may include a file name or class name, a file size or class size, a file or class checksum, for each file that is located in the applet cache. The present invention also contemplates that other information may be contained within the client manifest 34. This information may include the date that each file or class was created or last updated, information regarding other resources, and other information such as may be known in the art The server 24 includes a web page 36 that is stored on the server and is loaded by the client's browser 30 when requested. The web page 36 may reference or load a cache check applet 38. The cache check applet 38 located on the server 24 may be requested and loaded into the client's browser 30. It is to be understood that the cache check applet 38 may be referenced in web page 36. This reference of the cache check applet 38 in the HTML or other source code of web page 36 causes the client 22 to load the cache check applet 38. The cache check applet 38 then determines which files are needed and which are cached and available locally within client's cache 32. If no files are located in the client cache 32, then the server 24 may send an archive 40 to the client 22. The archive contains necessary files for, or associated with an applet such as class files or other resource files. In addition, server 24 may also contain each class file 42. The classes 42 may be sent from server 24 to client 22 as needed. For example, when only one class file has changed, only one class file need be sent from server 24 to client 22 and the entire archive 40 need not be sent. This decreases the amount of time required for the applet to be installed, loaded or otherwise prepared for execution. In addition, server 24 includes a server manifest 44. The server manifest includes the listing of the files required by the applet as well as other information such as shown in FIG. 3. The present invention contemplates that other related file information including dates and times may also be included within the server manifest. The present invention further contemplates that the server manifest 34 may also include information related to the time when updates of a particular client manifest were last made.

Thus, a general description of a persistent applet cache has been described and set forth above. It is to be understood that the invention contemplates variations such as the language of the applet, the contents of the server manifest, the contents of the client manifest, and other variations such as may be desired or required in a particular context. The present invention is only to be limited by the claims appended hereto.

What is claimed is:

1. A method of applet loading on a client comprising the steps of:
   requesting a web page from a server, the web page including an applet tag identifying a first applet for execution;
   executing the first applet in response to receiving the web page;
   determining if a second applet is cached locally in a persistent and dedicated client cache based on the execution of the first applets;
   wherein the client cache is separate and distinct from a browser cache.

2. The method of claim 1 wherein the second applet is not cached locally and further comprising the steps of:
   downloading the second applet; and
   caching the second applet locally in the persistent and dedicated client cache.

3. The method of claim 1 wherein the step of determining if the second applet is cached locally determines whether a client manifest exists.

4. The method of claim 3 further comprising:
   comparing the client manifest with a server manifest;
   wherein the client manifest specifies a plurality of class files required by the second applet and the server manifest specifies a plurality of class files required by the second applet.

5. The method of claim 4 wherein the step of comparing the client manifest with the server manifest includes comparing a first file name in the client manifest with a second file name in the server manifest.

6. The method of claim 5, the step of comparing the client manifest with the server manifest further includes comparing a first checksum in the client manifest with a second file checksum in the server manifest.

7. The method of claim 5, the step of comparing the client manifest with the server manifest further includes comparing a first file size in the client manifest with a second file size in the server manifest.

8. The method of claim 1 wherein the step of determining if a second applet is cached locally includes determining if a plurality of class files associated with the second applet are cached locally.

9. A system of persistent applet caching comprising:
   a client running a web-enabled application capable of running a cache check applet and a second applet, the client having a cache for storing the second applet; and
   a server storing a web page, a cache check applet, and a second applet, the cache check applet capable of determining whether the second applet is stored in the client's cache; wherein the client and the server are operatively connected over a network, the web-enabled application on the client loading the web page over the network from the server, and running the cache check applet, the cache check applet capable of loading the second applet from the client's cache and from the server;
   wherein the cache is a persistent and dedicated cache separate and distinct from a browser cache.

10. A system for persistent applet caching comprising:
    a web page located on a server, the web page accessible by a client;
    a first applet associated with the web page; and
    a second applet, the first applet capable of determining if the-second applet is cached on the client in a persistent and dedicated cache separate and distinct from a browser cache and the first applet capable of receiving the second applet from the server and caching the second applet on the client.

11. The system of claim 10 wherein the first applet is a JAVA applet.

12. The system of claim 10 wherein the second applet is a JAVA applet.

13. The system of claim 10 wherein the second applet includes one or more class files.

14. An apparatus for providing persistent applet caching on a client, the apparatus located on a server having a web site containing web page code, the apparatus compromising:
    an applet tag in the web page code on the web server; and
    a first applet embedded in the web page code through use of the applet tag, the first applet (a) capable of being executed on the client, (b) capable of determining whether a second applet is present on the client, (c) capable of causing the second applet to be loaded into a cache on the client, and (d) capable of causing the second applet to be executed by the client;
    wherein the cache is persistent, dedicate, and separate and distinct from a browser cache.

15. The apparatus of claim 14 wherein the first applet is a JAVA applet.

16. The apparatus of claim 14 wherein the second applet is a JAVA applet.

17. The apparatus of claim 14 wherein the second applet includes one or more class files.

18. A method of applet loading on a client comprising the steps of:
    requesting a web page from a server, the web page including a cache check to be executed by the client; and
    determining if an applet is cached locally in a persistent and dedicated client cache separate and distinct from a browser cache based on the execution of the cache check.

19. The method of claim 18 wherein the applet is a JAVA applet.

20. A method of applet loading on a client to reduce reloading of applets, comprising:
    requesting a web page from a server, the web page including an applet tag identifying a first applet for execution;
    executing the first applet in response to receiving the web page;
    determining if a second applet is cached locally in a persistent client cache based on the execution of the first applet, wherein the client cache is separate and distinct from a browser cache.

* * * * *

UNITED STATES PATENT AND TRADEMARK OFFICE
CERTIFICATE OF CORRECTION

PATENT NO.    : 6,910,066 B1
DATED         : June 21, 2005
INVENTOR(S)   : Pohl, Thomas J.

It is certified that error appears in the above-identified patent and that said Letters Patent is hereby corrected as shown below:

Column 6,
Line 8, should read -- the second applet is cached on the client in a persistent --.
Line 30, should read -- wherein the cache is persistent, dedicated, and separate and --.

Signed and Sealed this

Twenty-third Day of August, 2005

JON W. DUDAS
*Director of the United States Patent and Trademark Office*